(12) United States Patent
Oku et al.

(10) Patent No.: US 6,684,120 B1
(45) Date of Patent: *Jan. 27, 2004

(54) METHOD OF AND DEVICE FOR COLLECTING AND COMBINING FA INFORMATION

(75) Inventors: Masaharu Oku, Tokorozawa (JP); Satoru Shibao, Sayama (JP); Yukio Fujiyama, Kodaira (JP); Eiji Sasaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,527

(22) Filed: Dec. 3, 1999

(30) Foreign Application Priority Data

Dec. 3, 1998 (JP) .............................. 10-343684
Dec. 3, 1998 (JP) .............................. 10-343685
Dec. 3, 1998 (JP) .............................. 10-343686

(51) Int. Cl.[7] ........................ G06F 19/00; G06F 11/30
(52) U.S. Cl. ..................... 700/108; 700/111; 702/182
(58) Field of Search ................. 700/2, 4, 108, 700/109, 111, 164, 174; 340/540; 702/182

(56) References Cited

U.S. PATENT DOCUMENTS

| 5,668,741 A | * | 9/1997 | Prigent ........................ 702/182 |
| 5,673,194 A | * | 9/1997 | Cipelletti et al. ............ 700/115 |
| 5,721,722 A | * | 2/1998 | Kato et al. ...................... 700/2 |
| 5,862,054 A | * | 1/1999 | Li ............................... 700/108 |
| 5,995,916 A | * | 11/1999 | Nixon et al. ................ 700/117 |
| 6,128,543 A | * | 10/2000 | Hitchner ..................... 700/108 |
| 6,208,904 B1 | * | 3/2001 | Mullen, Jr. ..................... 700/2 |
| 6,233,492 B1 | * | 5/2001 | Nakamura et al. ............. 700/2 |
| 6,269,279 B1 | * | 7/2001 | Todate et al. ................ 700/108 |
| 6,285,966 B1 | * | 9/2001 | Brown et al. ............... 702/188 |
| 6,343,238 B1 | * | 1/2002 | Kudo ........................ 700/106 |

FOREIGN PATENT DOCUMENTS

| JP | 3-17803 | 2/1991 |
| JP | 4-268612 | 9/1992 |
| JP | 5-46631 | 2/1993 |
| JP | 5-307556 | 11/1993 |
| JP | 7-73130 | 3/1995 |
| JP | 9-108999 | 4/1997 |
| JP | 10-40298 | 2/1998 |

* cited by examiner

*Primary Examiner*—Leo Picard
*Assistant Examiner*—Elliot Frank
(74) *Attorney, Agent, or Firm*—Sughrue Mion, PLLC

(57) ABSTRACT

An FA information collecting method in an FA system for managing plural steps for manufacturing products by using a network connected to these respective steps, is described for quality management. In this method, when collecting working front information sent to a data transmission line in the network and generated in each of these steps, from an information collecting end provided to on the network, a desired information is automatically collected based on a given condition from among the working front information. Time changes in desired information are automatically collected based on a given condition from among the work front information. An FA information combining method and the desired information are automatically combined based on the given condition from among collected plural working front information.

20 Claims, 6 Drawing Sheets

METHOD OF AND DEVICE FOR COLLECTING AND COMBINING FA INFORMATION

BACKGROUND OF THE INVENTION

1. Field of the Invention

The present invention relates to a method of collecting and combining various working front information generated in each manufacturing step in an FA system which controls plural steps for manufacturing products by using the network connected with each manufacturing step.

The present invention also relates to a method of collecting various working front information generated in each manufacturing step, particularly, information (abnormal information) showing an occurrence of abnormality caused in a manufacturing step, in an FA system which controls plural steps for manufacturing products.

2. Related Art Statement

First of all, there is a method performed by man power as a conventional method of collecting work front information in the FA system. That is, various information, such as production control information, working information of machining tool and the like, quality information of products and failure information, or the like are collected by the work front worker etc.

However, it is difficult for the above-described related art method performed by man power to collect a large amount of information. Further, the above-described related art method takes number of man-hours and time in collection of information and causes mistakes easily in collection and counting of information.

Therefore, recently, above described various information are collected and recorded on the information device which is called as a shared server provided on the network of the FA system and makes it to the data base. The thus collected information can be utilized from the information collecting terminal provided on the network by accessing the data base recorded on the shared server by the user.

This method is suitable to perform a routine task in which the kinds and the form etc. of the data to be used are previously defined. However, in case of adding a new business, and in case of using information in the shared server in the methods other than routine task, or the like, the structure and the content of the data base are usually complex, so that it is difficult for the user to use information freely and easily.

Moreover, not only the load to shared server but also loads to the entire FA system become large when a number of users access the data base at the same time, so that the adverse effect might be caused for the operation of the entire system.

In the manufacturing working front comprising the plural steps for manufacturing products in a manufacturing industry, various information, such as production amount of products, working information of machining tool, quality information of products and failure information or the like are generated hourly. In order to perform the improvement of the quality of products and the improvement of equipment or the like effectively, these working front information must be properly collected, analyzed and studied.

In such manufacturing working front for managing respective steps by a method of collecting such working front information, especially by an FA system, above described various information is collected and recorded on the information device which is called as a shared server provided in the network of the FA system and makes it to the data base. The thus collected information can be utilized from the information collecting terminal provided on the network by accessing the data base recorded on the shared server by the user.

However, this method is suitable to perform a routine task in which the kinds and the form or the like of the data to be used are defined previously, but it is difficult for the user to obtain desired information by the method and objects other than routine task, and thus in case of accessing data base by a number of users simultaneously, the adverse effect might be caused for the operation of the FA system.

As a method of solving such a problem, a method of data transmission to the data collecting condition setting device, in which the data (i.e., information) collection condition setting device, set by the user, and a data collecting apparatus for collecting working front information in each manufacturing step based on the data collecting condition set with this setting device are provided on the network of the FA system, and a data collecting condition set by the user is transmitted to the data collecting device.

According to this method, The user can collect and utilize the desired information promptly and easily. However, in this method, in case of collecting plural information generated in plural processes to one, the amounts of collected data become excessive and thus the processing might become difficult. Moreover, in case of collecting plural information with different time generated by viewing a time change in working front information in one step, there is a problem that it is difficult to measure a timing where information is generated.

In addition, in this method, when data amount, to which the load of the data collecting device in case of collecting the above information is increased, becomes excessive, the problem that the exchange of the data between the data collecting condition setting device and the data collecting device makes the load of the entire FA system increased, can be caused.

Various working front information generated by manufacturing step of products in manufacturing, particularly, collection of abnormal information such as the occurrence of the malfunction of the manufacturing device and abnormality of products relies on especially man power, up to now. That is, the operating situation of the device and information on the quality of products etc. were seen from the various documents regularly outputted, and the presence of abnormal occurrence was checked.

However, when relying on man power, there is a possibility that a judgment mistake may occur during the check for leakage during a step of manufacturing of the item and the subjectivity of the person performing checks. Moreover, there is a problem that processing according to man power becomes difficult when the outputted amount of information becomes excessive.

SUMMARY OF THE INVENTION

It is an object of the present invention to eliminate the above described disadvantages of the conventional FA system.

It is another object of the present invention to provide a method of collecting FA information, in which working front information in manufacture working front can be collected and used easily and promptly.

It is another object of the present invention to provide a method of combining FA information capable of utilizing working front information in a manufacture working front environment, indicated as significant information by combining the collected information.

It is further object of the present invention to provide an FA information collecting method capable of collecting working front information in manufacturing step of products, especially abnormal information showing the occurrence of abnormality promptly and automatically.

According to the present invention, there is provided an FA information collecting method for use in an FA system for managing plural steps to manufacture products by using a network connected to these respective steps, characterized in that when collecting working front information sent to a data transmission line in the said network and generated in each of these steps, from an information collecting end provided to on the said network, a desired information is automatically collected based on a given condition from among the working front information.

According to the present invention, the necessary information can be collected automatically from among working front information sent on the network of the FA system and generated in each manufacturing step, based on the condition set to obtain desired information by the user Therefore, the person, who intends collection and utilization of working front information, can collect necessary information from among the working front information by the user's sorting out at necessary time, so that speeding-up of the collection of information and its analysis can be achieved. As a result, change and improvement of manufacturing condition which correspond to such as needs of the market, the change of the environment or the like, improvement of the business and the improvements of the quality of the productivity can be aimed at more promptly.

Moreover, according to such a method, a plurality of users, who try to collect working front information, access the data base in shared server at the same time, and, as a result, It comes to be avoided to cause the influence of the decrease in process of FA system etc.

In a preferable embodiment of the FA system according to the present invention, the working front information are sent to the data transmission line of the network at each generation of said information in respective steps.

According to such an embodiment, various working front information generated hourly in each manufacturing step are always sent on the network of the FA system, so that these working front information, especially the fault generated in the manufacturing step or the like can be known at once, and can be dealt therewith promptly.

In a preferable embodiment of the FA information collecting apparatus according to the present invention, an FA system for managing plural steps to manufacture products by using a network connected to these respective steps, working front information sent to a data transmission line in said network and generated in each of these steps are collected, characterized in that desired information is automatically collected based on the given condition from among the working front information.

According to such an embodiment, a device capable of obtaining the desired information based on the given condition from among the working front information generated in respective steps is provided in the FA system by the user, so that the collection and its analysis of the working front information by the user can be performed promptly and efficiently, and thus the improvement of the business, the quality of products, and the improvement of productivity or the like can be aimed at. Moreover, the situation that a plurality of user accesses the data base in shared server can be avoided.

In a preferable embodiment of the FA information collecting apparatus according to the present invention, the apparatus further comprises at least one data collecting condition setting means for setting the data collecting condition to collect the desired information, and at least one data collection managing means for collecting the desired information based on the data collecting condition set by the data collecting condition setting means.

According to such an embodiment, means for setting and inputting (instructing) the condition to obtain desired information set by the user and means for collecting working front information are separated with each other, so that the load of the information collection device in the information collecting work can be distributed. Moreover, with such a constitution, information collection can be performed from one data collecting condition setting means to the plural data collection managing means, or the information can be sent from one data collection managing means to plural data collecting condition setting means oppositely, and thus the working front information can be collected efficiently.

In a preferable embodiment of the FA system according to the present invention, there is provided an FA system for managing plural steps to manufacture products by using a network connected to these respective steps, comprising at least one data collecting condition setting device for setting the condition to collect desired information, among working front information generated in each of respective steps and sent to data transmission line in the network, and at least one data collection managing device for collecting desired information from among the working front information based on the condition set by the data collecting condition setting device.

According to such an embodiment, there is provided the device capable of obtaining various working front information generated hourly by each manufacturing step promptly and directly can be provided in the FA system by sorting out the desired information by the user himself, that is, the person who intends collection and utilization of the information. Therefore, collection of information which requires urgent dealing, such as collection and analysis of working front information, particularly, generation of the trouble or the like can be performed, as a result, the collection and its analysis of the working front information by the user can be performed promptly and efficiently, and thus the improvement of the business, the quality of products, and the improvement of productivity or the like can be aimed at. Moreover, the situation that a plurality of user accesses the data base in shared server can be avoided.

According to the present invention, there is provided a method of combining FA information for use in an FA system for managing plural steps to manufacture products by using a network connected to these respective steps, characterized in that when collecting working front information sent to a data transmission line in the said network and generated in each of these steps, from an information collecting end provided to on the said network, desired information are automatically combining based on the given condition from among collected plural working front information.

According to such an embodiment, the user combines desired and collected information according to the given condition from among working front information generated in each manufacturing step, and sent on the network of the FA system, thereby obtaining significant information.

Therefore, the person intending the collection and utilization of working front information, can collect information necessary from among the working front information, particularly and becoming usually increase of data amount, such as plural working front information etc. generated in plural steps. As a result, change and improvement of manufacturing condition which correspond to such as needs of the market, the change of the environment or the like, improvement of the business and the improvements of the quality of the productivity can be aimed at more promptly. Moreover, the increase of the load of the FA system caused by treating a large amount of data can be avoided.

In a preferable embodiment of the FA information combining method according to the present invention, a plurality of working front information with different generation time are combined.

According to such an embodiment, time changes in plural information with different generation time that data amount becomes excessive in general, for example, in working front information generated in one step, can effectively known.

According to the present invention, there is provided an apparatus for combining FA information for use in an FA system for managing a plurality of steps to manufacture products by using a network connected to these respective steps, in which working front information sent to a data transmission line in said network and generated in each of these steps are collected, characterized in that the apparatus comprises at least one data collecting condition setting means for setting the data collecting condition to collect the desired information, at least one data collection managing means for collecting the desire based on the data collecting condition set by the data collecting condition setting means, and at least one data combining means for combining the desired information collected by the data collection managing means based on the data collecting condition and for transmitting said combined information to the data collecting condition setting means.

According to such an embodiment, the data coupling device to which information on the desire of the user collected with the data collection managing device is coupled based on the data collecting condition. The data collecting condition is set based on the provision between the data collection managing devices that collect information on the aforementioned desire, based on the data collecting condition setting device that sets the data collecting condition for the user who intended collection of working front information to collect desired information and the data data collecting condition, wherein the information representing that data amount becomes excessive. For example, but not by way of limitation, a time change in information necessitated by the user, especially information corresponding to plural steps and in working front information in one step, can be collected efficiently. Moreover, the increased load of the FA system caused by treating a large amount of data can be avoided.

According to the present invention, there is provided an FA system for managing plural steps manufacturing products by using a network connected to these respective steps, comprising at least one data collecting condition setting device for setting the condition to collect desired information, among working front information generated in each of respective steps and sent to data transmission line in the network, at least one data collection managing device for collecting desired information from among the working front information based on the condition set by the data collecting condition setting device, and at least one data combining means for combining the desired information collected by the data collection managing means based on the data collecting condition and transmitting said combined information to the data collecting condition setting means.

According to the present invention, there is provided in the FA system the data coupling device to which information on the desire collected with the data collection managing device is coupled, based on the data collecting condition by the provision between the data collection managing devices which collect information on the desire based on the data collecting condition setting device, which sets a data collecting condition for the user who intended collection of working front information to collect desired information and data collecting condition, the information that data amount becomes excessive. For example, but not by way of limitation, a time change in information necessary by the user, especially information corresponding to plural steps and in working front information in one step, can be collected efficiently. Moreover, the increase of the load of the FA system caused by treating a large amount of data can be avoided.

According to the present invention, there is provided an FA information collecting method for use in an FA system for managing plural steps to manufacture products by using a network connected to these respective steps, characterized in that when collecting working front information sent to a data transmission line in the said network and generated in each of these steps, from an information collecting end provided to on the said network, a time change in desired information is automatically collected based on a given condition from among the working front information.

According to such an embodiment, time changes in working front information generated by the manufacturing step can be collected easily and surely. Therefore, abnormal information such as the occurrence of the malfunction of the manufacturing device and abnormality of the products at once can be known, promptly dealing with this information becomes possible. Moreover, the presence of an abnormal occurrence is automatically checked without depending on man-power, so that the load and number of man-hours of the worker etc. can be reduced.

In a preferable embodiment of the FA information collecting method according to the present invention, the desired information are compared with the previously set limit value of management, and it judges that abnormality occurs in a step, when abnormal value is detected.

According to such an embodiment, it is judged that abnormality occurred when working front information are exceeded or fall below the limit value of management previously set, so that the occurrence of abnormality can be known at once, and can be dealt with this at the early stage.

In a preferable embodiment of the FA information collecting method according to the present invention, the desired information are collected over a period which went back from the point at which the abnormal value is detected only at past predetermined time.

According to such an embodiment, a passage from an point to an abnormal occurrence at the past can be known, so that Performing elucidation and the correspondence of the cause of an abnormal occurrence can be performed at the early stage.

In a preferable embodiment of the FA information collecting method according to the present invention, a signal representing the occurrence of the abnormality is sent to the data transmission line in the network at the same time as the occurrence thereof.

According to such an embodiment, the information are sent to the network of the FA system which has jurisdiction over the manufacturing step at the same time as abnormality's occurring, so that the occurrence of abnormality can be instantaneously known. Therefore, prompt correspondence to abnormality becomes possible.

In a preferable embodiment of the FA information collecting method according to the present invention, the abnormal value is judged to be an occurrence of abnormality in the step by having detected a fixed frequency in the given period.

According to such an embodiment, scattering etc. of the quality of product generated in the given period are detected, so that the occurrence of abnormality can be found at the forecast or the early stage, and thus prompt correspondence to this becomes possible.

In a preferable embodiment of the FA information collecting method according to the present invention, there is an tendency that a time change in the desire information in the given period is adjacent to the limit value of management, and the abnormal value is judged to be an occurrence of abnormality in the step when a time change exceeds the said limit value.

According to such an embodiment, the tendency, which changes the quality of product and the operating situation of the manufacturing device from normal to abnormal, can be grasped, and thus the possibility that abnormality occurs afterwards can be forecast. Therefore, the occurrence of abnormality can be known, beforehand, and thus the prompt dealing with this becomes possible.

DETAILED EXPLANATION OF THE PREFERRED EMBODIMENTS

Now to the drawings, there are shown various embodiments of according to the present invention.

Hereafter, a suitable embodiment of the present invention is explained.

Figure 1:
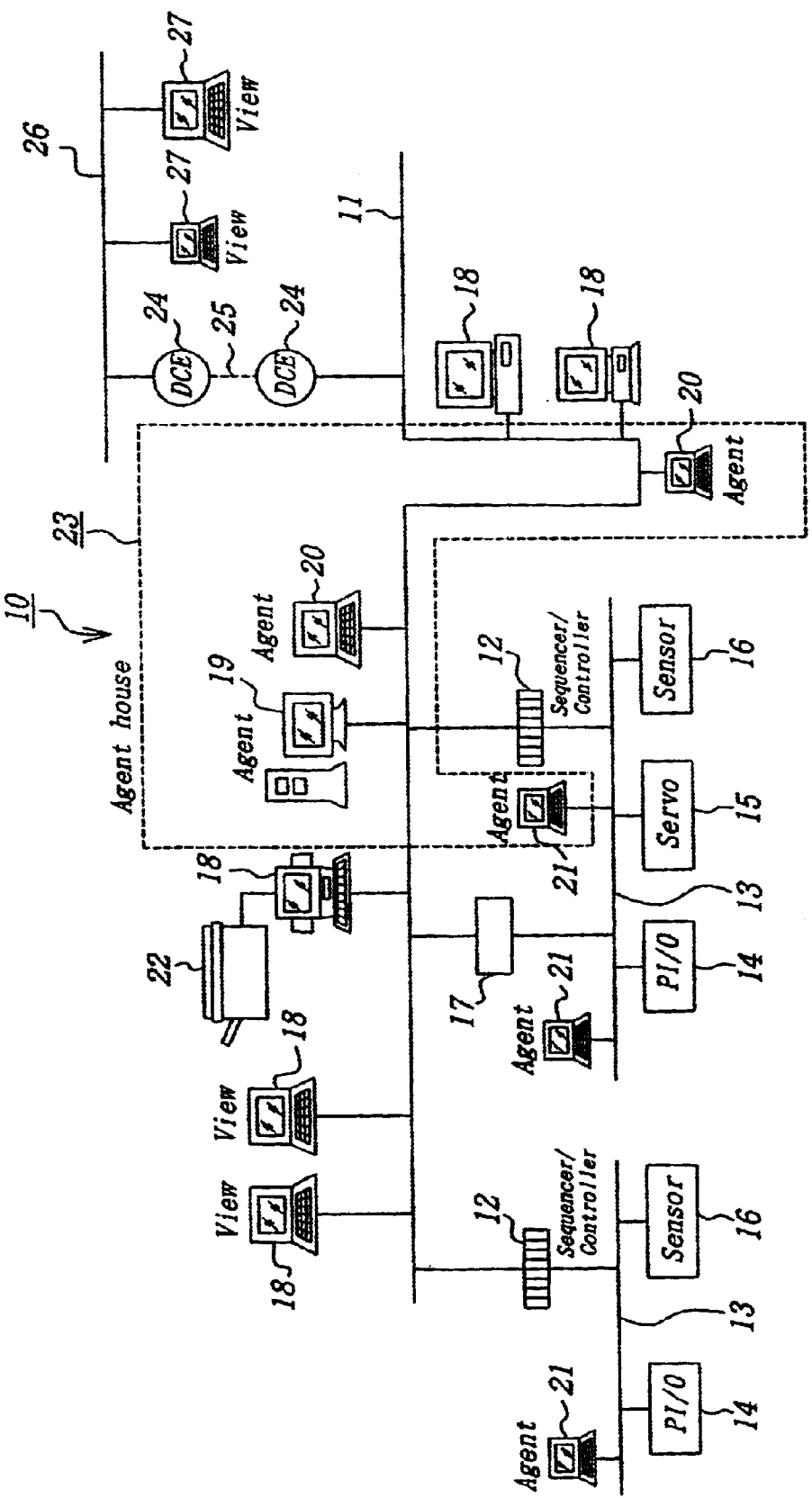
FIG. 1 is a block diagram showing the outline of the FA system which applies the method according to the present invention.

FIG. 1 is a block diagram showing in the outline an FA system which applies method according to the present invention. As shown in FIG., FA system 10 comprises a network bus 11 and controls manufacturing steps through the network bus 11.

A sequencer 12 is connected to the bus 11. The sequencer 12 controls exchange of the signals between a line 13 of the manufacturing step and bus 11. The sequencer 12 stores a sequence program of each manufacturing step, so that each manufacturing step is controlled by the sequencer program.

In each manufacturing step, PI/O 14, SERVO 15, and SENSOR 16 (Parallel I/O) are connected to the line 13, so that these equipment operate by an instruction from the sequencer 12.

Moreover, a router 17, which is a repeating device for the information transmission, is intervened between the bus 11 and the line 13 of the manufacturing step, so that various working front information, such as control information of the equipment, production control information, working information, quality information, manufacturing condition information, and trouble information, etc. are transmitted to the bus 11, for multiple destination.

Plural terminals 18, 19 and 20 are provided to bus 11, and plural terminals 21 are provided to line 13, and then, a printer 22 is connected to a part of these terminals 1 8(only one thereof is shown in FIG. 1). These terminals 18–21 serve to perform a supervisory every step and to collect above various information, so that respective terminals perform the supervisory and information collection according to the role to be described later respectively. Moreover, the terminal 19 in FIG. 1 is a shared server in this FA system 10.

Terminal 18 serves to collect various working front information transmitted to bus 11 in accordance with data collecting condition set by the user himself, that is, a person who intends the utilization of these working front information. This terminal 18 is defined here as the data collecting condition setting device (hereinafter, referred to as "View").

View 18 provides information on the FA system 10 to the user in an at-a-glance form. The user can set the condition to collect desired information as described above by using View 18. Moreover, data collecting condition set by user are referred to as Mission in the following explanations.

In FA system 10, a data collection managing mechanism 23(Hereafter, referred to as "Agent house") is provided. Terminals 19–21, which belongs to the Agent house 23, play the role of the data collecting device (Hereafter, referred to as "Agent") performing a collection of working front information based on a data collecting condition (Mission) set in the View 18 by the user.

Next, the collection procedure of working front information is explained by using these View and Agent.

As described above, Mission set by user is sent from View 18 to Agent house 23 through bus 11. The Mission is received by Agents 19–21 in Agent house 23, and the Agents collect the working front information according to the content of Mission. The number of Agent, which actually performs information collection, may one or plural, and this is selected by Mission, and specified.

Collected working front information (data) are stored in Agent, and are transmitted to the originator (View) of Mission at the completion of collection or are sequentially transmitted from Agent to View. The View 18, which receives information from Agent, stores this data.

The data stored in View 18 is processed, and analyzed by the spreadsheet software or the like provided in View 18 beforehand, and the result is displayed on the screen, or is outputted to a printer 22. The user performs the improvement of equipment, the change in the manufacturing condition, and the correspondence or the like to the trouble based on this result.

Moreover, the user can send Mission from View 18 to shared server 19 in this FA system 10. That is, from among the data base in shared server 19 when the user sends Mission from View 1.8 to shared server 19 to obtain desired information, the data accumulated in the data base is taken out according to Mission as well as above described Agent, and are sent to the user by the shared server 19.

In addition, this FA system 10 may be connected to an external network 26 through a telecommunication line 25 by DCE (data circuit-terminating equipment) 24 connected with bus 11, as a result, a terminal 27 connected with the network 26 can be used as above-mentioned View. With such a constitution, it is also possible to control the plural factory intensively by one place a large amount of data can be avoided.

Hereafter, a suitable embodiment of the present invention is explained.

Figure 2:
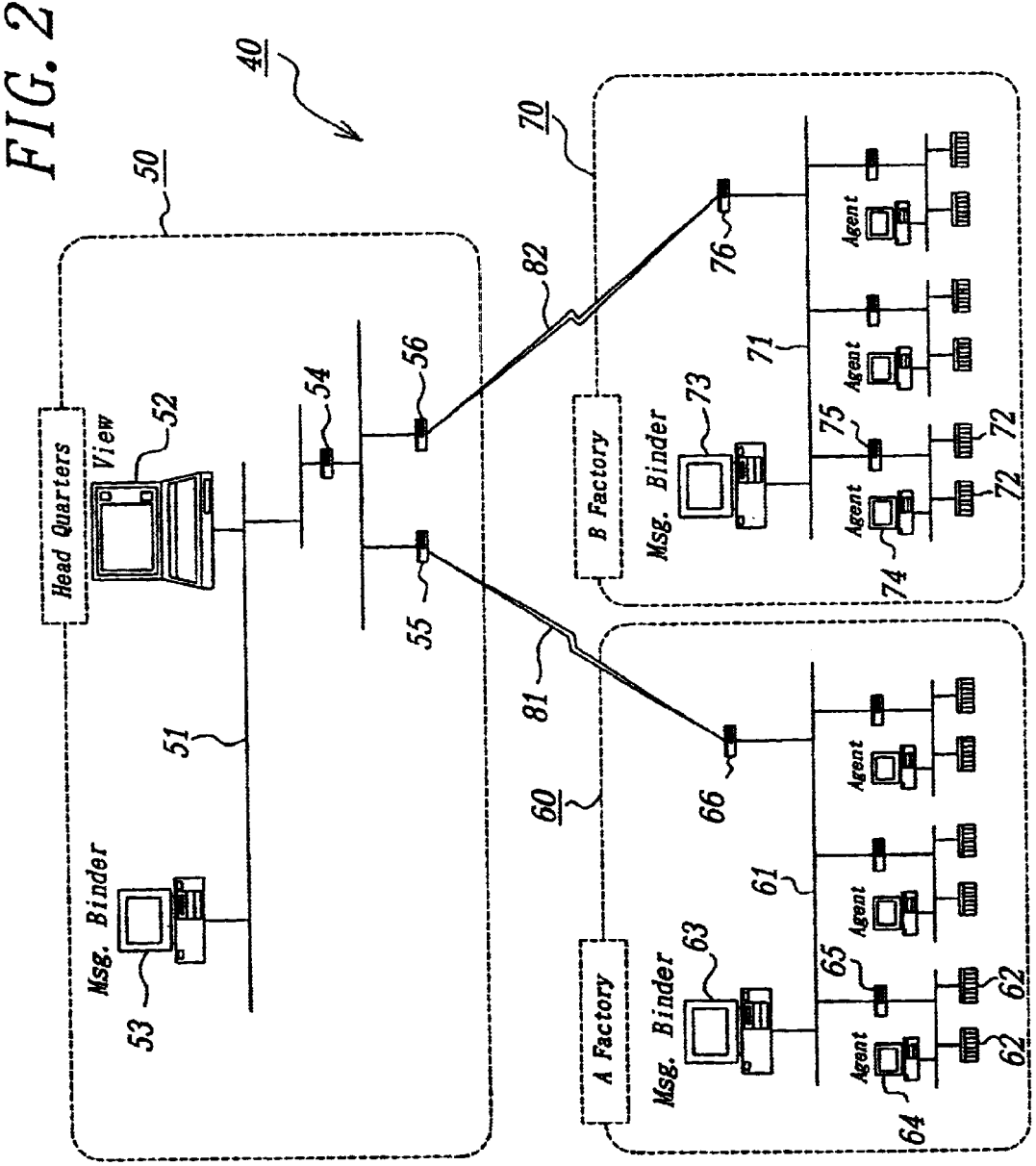
FIG. 2 is a block chart showing the outline of one embodiment of the FA system according to the invention.

FIG. 2 is a block diagram showing the outline of an FA system which applies method according to the present invention. An FA system 40 shown in FIG. 2 connects a head quarters and two factories (A factory and B factory) being in two places. LAN 50 is provided in the head quarters, LAN 60 is provided in A factory and LAN 70 is provided in B factory.

LAN 50 in the headquarters comprises a network bus 51, which includes information terminals 52, 53, a router 54 which is a repeating device for information transmission, and DCEs 55 and 56 (Data Circuit terminating Equipment), respectively. Moreover, usually, these elements may have plural components, but in FIG. 2, for convenience sake, these elements are shown as only one element.

LANs 60, 70 in the factory each comprises network buses 61 and 71 respectively, and respective buses include sequencers 62, 72 to control each manufacturing step in the factory, information terminals 63, 64, and 73, 74, routers 65, 75, DCE 66, 76, respectively. Moreover, LANs 60 and 70 are connected to LAN 50 in the head quarters by telecommunication lines 81 and 82 respectively, so that data can be transmitted and received.

Terminal 52 of LAN 50 in the head quarters serves to collect working front information collected in each factory according to data collecting condition set by the user who intends the utilization of these working front information. This is defined here as a data collecting condition setting device (hereinafter, referred to as "View").

This FA system 40 can be seen what information to be had in an at-a-glance form in this View 52. The user can set the condition to collect desired information as described above by using View 52. Moreover, data collecting condition set by user are referred to as Mission in the following explanations. This Mission may be inputted directly from the View 52 by the user or may be made a form of data file memorized in an external memory device such as floppy disks which is previously formed by using other computer or the like.

Moreover, a terminal 53 of LAN 50 in the headquarters, and terminals 63 and 73 in factories 60 and 70 are serve to combine working front information in each factory according to Mission set with the View 52. This is defined here as a data combining device (Hereafter, it is called "Msg. Binder"). Here, terminals 63 and 73 serve to collect and combine information on each manufacturing step collected in each factory. Terminal 53 serves to combine these information further.

Terminals 64 and 74 of LANs 60, 70 in each factory play the role of a data collecting device (hereinafter, referred to as an "Agent"), which performs collection of working front information in every each manufacturing step based on (Mission) set at the View 52 by the user.

Next, collection and the uniting procedure of working front information in the FA system according to the present invention are explained. Moreover, here, for easiness, the invention is explained with reference to FIG. 3 simplifying FIG. 1, the functions of a fundamental constitution and each component are common.

Figure 3:
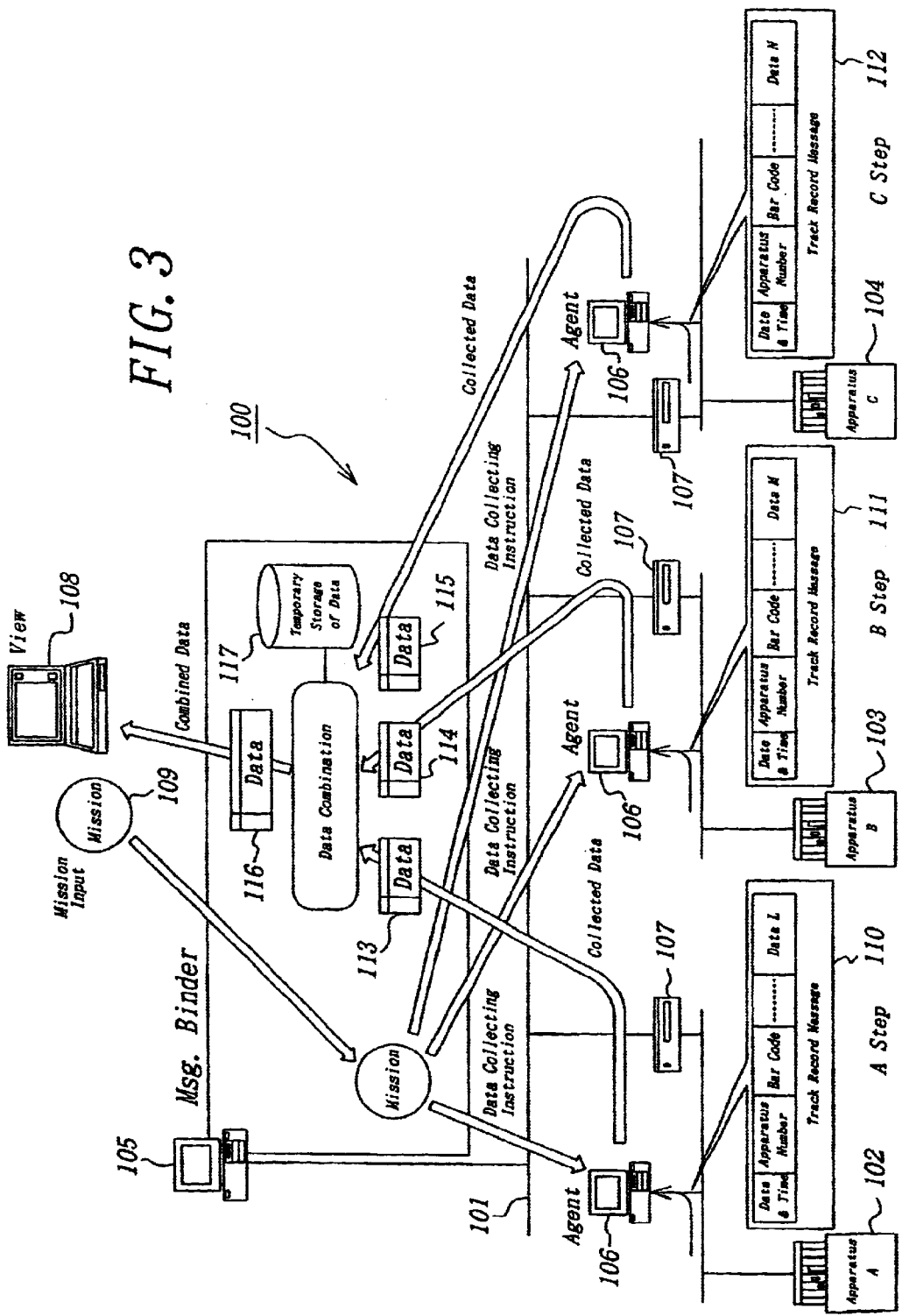
FIG. 3 is a block chart showing the outline of the working front information collecting procedure in FA system according to the invention.

The FA system 100 shown in FIG. 3 comprises a network bus 101, which is connected to manufacturing device 102, 103 and 104 (including sequencer) corresponding to respective steps (here, three step thereof are taken up, and referred to as steps A, B, and C respectively) in each factory. Moreover, terminals 105, 106 and 108 as well as a router 107 are provided to. Moreover, a terminal 108 may be connected directly to the network bus 101, or may be connected to the network bus 101 through external communication circuit (not shown).

First of all, Mission 109 set by the user is sent to Msg. Binder 105 from View 108. This Mission 109 comprises conditions of addressing the step for collecting working front information, of collecting desired information from among working front information in each manufacturing step and of combining collected information. Msg. Binder 105 transmits the data collection instruction to each Agent 106 according to the content of Mission 109. Though Agent 106 of each manufacturing step of A–C is a destination in FIG. 3, the user should specify the destination with Mission109 as mentioned above. That is, Agent, which actually performs collection of working front information, is one and even plural acceptable.

agent 106, which receives the data collection instruction, collects working front information outputted from devices 102 to 104 of respective manufacturing steps. In embodiment shown in FIG. 3, the information 110 to 112 are collected by respective Agents 106 in the form of given style (Track record message). Moreover, this message format is to be set in condition by mission 109. Here, the message format consists of the plural data concerning the data and time, the number of the manufactering device of each manufacturing step, the bar code showing types of products as well as products and the device Respective collected messages 110–112 are stored in each Agent 106, respectively, and are transmitted to Msg. Binder 105 at the completion of collection or are one by one transmitted from each Agent 106 to Msg. Binder 105. Msg. Binder 105, which receives the message from each Agent 106, stores these messages. Next, Msg. Binder 105 combine messages 110–112 according to the condition set by Mission 109, and transmits them to View 108 as a combined data 116.

Afterwards, data 116 stored in View 108 is processed and analyzed by the spreadsheet software or the like provided in View 108 beforehand, and the result thereof is displayed on the screen, or is outputted to the output unit such as printers which is not shown. The user performs the improvement of equipment, the change in the manufacturing condition, and the correspondence to the trouble or the like based on this result.

In addition, the FA system 10 may be connected with external network 26 through telecommunication line 25 according to DCE 24(data circuit terminating equipment) connected with bus 11, and as a result, terminal 27 connected with the network 26 can be used as above described View.

These View and Agent were used, and the collection procedure of working front information is as follows. First of all, Mission set by the user is sent from View 18 to Agent house 23 via bus 11. The Mission is received by Agents 19–21 in Agent house 23, and collects working front information according to the content of Mission. Agent, which actually performs information collection, is one and even plural acceptable, and here, the selection thereof is performed and specified by Mission. Moreover, the condition (its embodiment is described later) to detect abnormal information is also specified by the Mission. Collected working front information (data) are stored in Agent, are transmitted to originator (View) of Mission at the completion of collection or are transmitted from Agent to View one by one. View 18, which receives information from Agent, stores the data. The data stored in View 18 are processed by the spreadsheet software or the like provided to View 18 previously, and analyzed. The result thereof is displayed on the screen or outputted to printer 22. The user knows the presence of abnormal generation in the manufacturing step by viewing this result.

In this FA system 10, Agents 19–21, which collect working front information, are collected and stored the information specified by Mission every each fixed period of collection, for instance, the number (or, lot number) or time. The user of said information can know the transition and the change by doing like this. Moreover, the stored information must be updated from old information at any time at the time of entering new information.

Next, the method of abnormal detection in this FA system 10 is explained.

Figure 4:
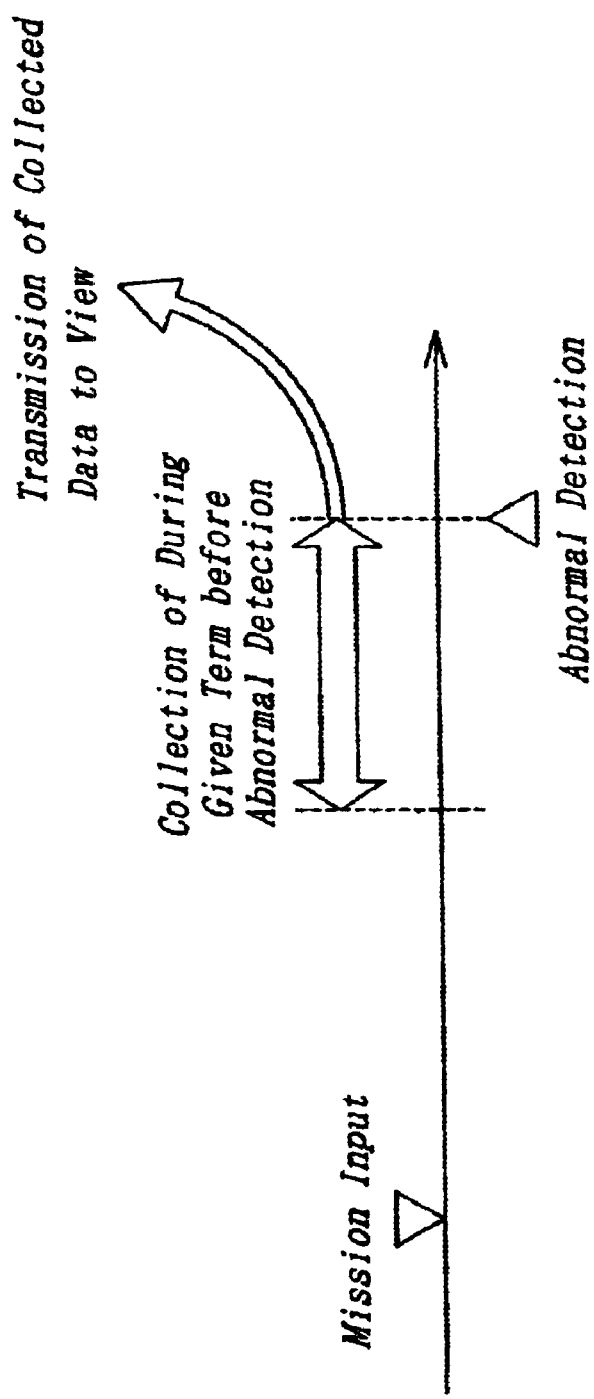
FIG. 4 is a time chart showing the outline of the abnormal detection procedure according to this method.

FIG. 4 is a timing chart showing an outline of the operation of the Agent from the Mission input in this system to the abnormal detection. The Agent, which receives Mission from View, collects and stores the specified information (measured data), sequentially. This data is collated with the condition specified by Mission. When abnormal data, which corresponds to a specified condition, and which for example exceeds or falls below constant value, is detected, the Agent collects data over a period from the point where said abnormal data is detected to a fixed period of the past among the data collected till then, and thus is transmitted to View. Moreover, though the data is collected going back to the past, as described above, the data for a fixed period of the past is stored in Agent, so that the thus stored data is sent to View.

Hereafter, the concrete example of abnormal detection is explained.

(1) Abnormal Detection of Data Chain

Now, considering that change of data, for example, for each amount of unit production in specific step, such as the quality of products manufactured continuously in manufacturing step and the operating situation of the device, is seen in time series (this is referred to as "Data Chain"). In this case, it is assumed that the limit value (upper limit value of management and lower limit value of management) of these data is provided previously, and the condition to judge that it is these limit values, and is abnormal generation in Mission, that is, whether it is judged it is abnormal when the data coming off from the limit value, is generated times how many is assumed to be specified.

Figure 5A:
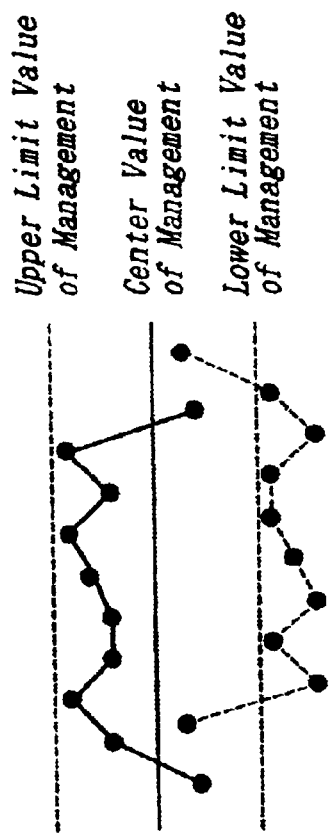
FIGS. 5a and 5b illustrate time charts showing the outline for one example of the abnormal detection procedure according to this method.
Figure 5B:
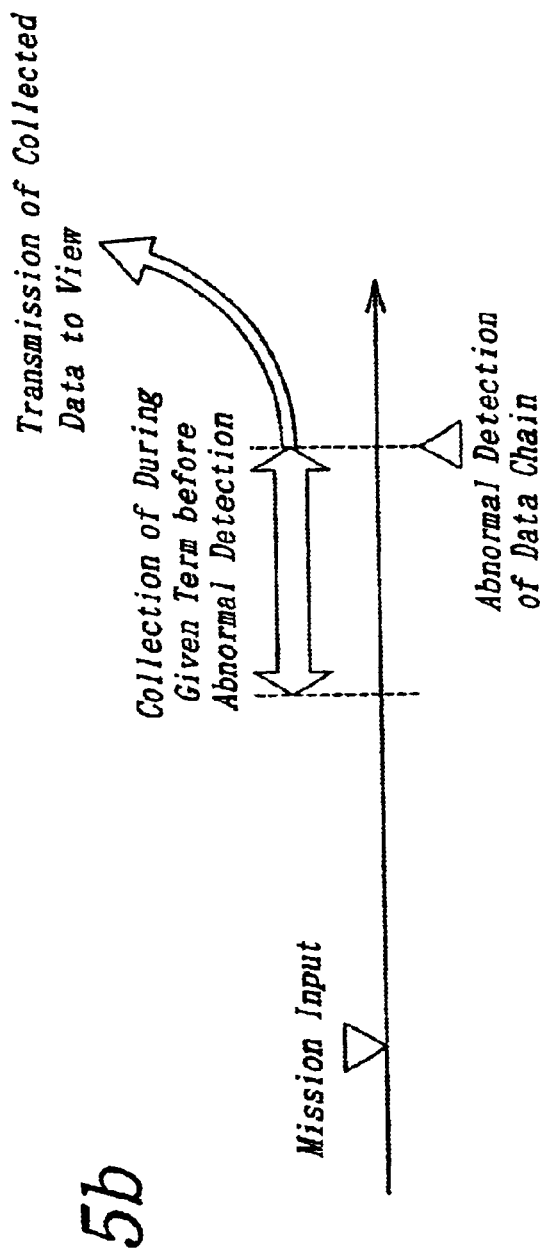

Here, the change of the data to be examined is shown in FIG. 5(*a*). As shown in FIG. 5(*a*), both the series (data chain) of the data shown by the solid line are below the upper limit value of management, so that it is judged that abnormality of the data chain does not occur. On the other hand, two or more values, which fall below the lower limit value of management, have been generated in the data chain showing by broken line. It is judged that abnormality occurs when the number exceeds the predetermined number.

FIG. 5(*b*) is a time chart showing the outline of operation of Agent to detect abnormality of the above described data chain. As described above, Agent, which receives Mission from View, collects and stores specified information (measured data), sequentially, and the change in the data shown in FIG. 5(*a*) by the graph is checked based on the condition specified by Mission. As a result, abnormality of the data chain shown in FIG. 5(*a*) by broken line occurs, when the abnormal data are generated with a given frequency, Data during a given period of the past before the abnormal detection from that time is collected, and the result is transmitted to View.

(2) Abnormal Detection of Trend

Figures 6A, 6B, 6C, 6D:
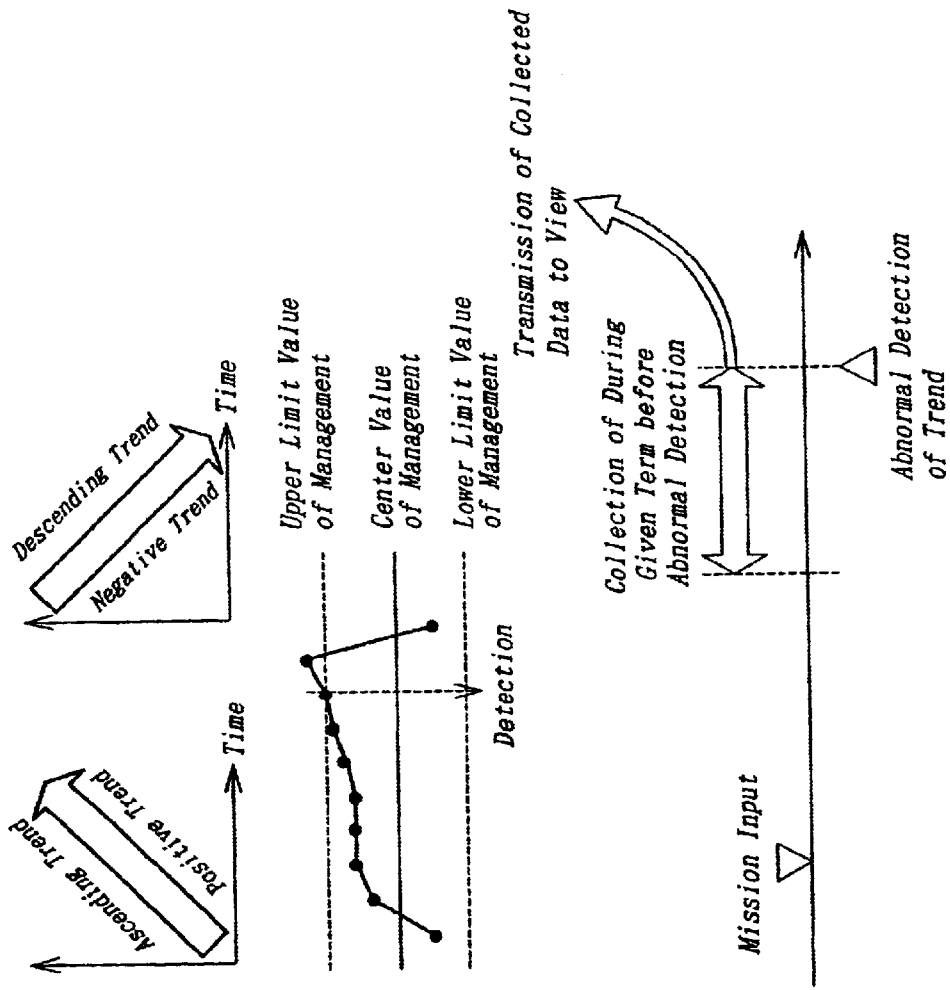
FIGS. 6a–6d illustrate time charts showing the outline for other examples of the abnormal detection procedure according to this method.

Considering that how do the quality of products and the operating situations of the manufacturing device change with time? Particularly, consider the case where the tendency is whether the value of data showing these situations to be in the ascending trend as shown in FIG. 6(*a*), or in the descending trend as shown in FIG. 6(*b*). In this case, the limit value is provided as well as the abnormal detection of the above described data chain, and the condition to be judged to be abnormal, that is, the trend of data is examined in Mission, is specified to be abnormal at the time of reaching or exceeding the limit value.

The change of the data to be examined is illustrated in FIG. 6(*c*). The trend of data rises toward the upper limit value of management as shown in FIG. 6(*c*). It is judged that abnormality occurs when for example the trend reaches the limit value of management.

FIG. 6(*d*) is a time chart showing the outline of operation of Agent to detect abnormality of the above described data chain. As described above, Agent, which receives Mission from View, collects and stores specified information (measured data), sequentially, and the trend of the data shown in FIG. 6(*c*) by the graph is checked based on the condition specified by Mission. As a result, when data show a tendency as shown in FIG. 6(*c*), and reach the limit value of management, data during a given period of the past before the abnormal detection from that time is collected, and the result is transmitted to View.

What is claimed is:

1. An FA information collecting method for an FA system that manages steps for manufacturing a product, using a network, the method comprising:

collecting working front information sent to a data transmission line in the network and generated in each of said steps for manufacturing, from an information collecting end provided on said network; and collecting desired information automatically, based on a given condition, selected from the working front information, wherein said given condition includes an abnormality determined by comparing said desired information to a prescribed threshold.

2. The FA information collecting method as claimed in claim 1, wherein the working front information is sent to the data transmission line of the network at each generation of said information in each of said steps.

3. An FA information collecting apparatus in an FA system that manages the manufacture of a product by using a network, the apparatus comprising:

means for collecting working front information sent to a data transmission line in the network and generated in each of said steps for manufacturing said products; and means for collecting desired information automatically, based on a given condition, from among the working front information, wherein said given condition includes an abnormality determined by comparing said desired information to a prescribed threshold.

4. The FA information collecting apparatus as claimed in claim 3, further comprising:

means for setting a data collecting condition to collect the desired information; and means for collecting the desired information based on the data collecting condition set by the means for setting the data collecting condition.

5. An FA system for managing plural steps manufacturing products by using a network connected to these respective steps, comprising:
- at least one data collecting condition setting device for setting a condition to collect desired information from among working front information generated in each of respective steps and send said desired information to a data transmission line in the network; and
- at least one data collection managing device for collecting said desired information based on the condition set by the at least one data collecting condition setting device, wherein said condition includes an abnormality determined by comparing said desired information to a prescribed threshold.

6. A method of combining FA information for use in an FA system for managing plural steps to manufacture products by using a network, the method comprising:
- collecting working front information sent to a data transmission line in the network and generated in each of said plural steps, from an information collecting end provided on the network; and
- combining desired information automatically, based on the given condition, from among said collected plural working front information, wherein said given condition includes an abnormality determined by comparing said desired information to a prescribed threshold.

7. The FA information combining method as claimed in claim 6, wherein a plurality of working front information with different generation times are combined.

8. An apparatus for combining FA information for use in an FA system for managing a plurality of steps to manufacture products by using a network, comprising:
- means for collecting working front information sent to a data transmission line in said network and generated in each of said plural steps;
- at least one data collecting condition setting means for setting the data collecting condition to collect the desired information;
- at least one data collection managing means for collecting the desired information based on the data collecting condition set by the data collecting condition setting means; and
- at least one data combining means for combining the desired information collected by the data collection managing means, based on the data collecting condition, and for transmitting the combined information to the data collecting condition setting means, wherein said data collecting condition includes an abnormality determined by comparing said desired information to a prescribed threshold.

9. An FA system for managing plural steps to manufacture products by using a network, comprising:
- at least one data collecting condition setting device for setting the condition to collect desired information, among working front information generated in each of said steps and sent to data transmission line in the network;
- at least one data collection managing device for collecting desired information from among the working front information based on the condition set by the data collecting condition setting device; and
- at least one data combining means for combining the desired information collected by the data collection managing means, based on the data collecting condition, and for transmitting said combined information to the data collecting condition setting means, wherein said data collecting condition includes an abnormality determined by comparing said desired information to a prescribed threshold.

10. An FA information collecting method for use in an FA system for managing plural steps to manufacture products by using a network, the method comprising:
- collecting working front information sent to a data transmission line in the network and generated in each of said plural steps, from an information collecting end provided on said network; and
- collecting changes over time in desired information automatically, based on a given condition from among the working front information, wherein said given condition includes an abnormality determined by comparing said desired information to a prescribed threshold.

11. An FA information collecting method as claimed in claim 10, wherein the desired information is compared with a previously set limit value of management, to determine if said abnormality occurs in a step, in case an abnormal value is detected.

12. An FA information collecting method as claimed in claim 11, wherein the desired information is collected over a period beginning at the point when the abnormal value was detected at a past predetermined time.

13. An FA information collecting method as claimed in claim 11, wherein a signal representing the occurrence of the abnormality is sent to the data transmission line in the network at the same time as the occurrence thereof.

14. An FA information collecting method as claimed in claim 12, wherein the abnormal value is judged to be an occurrence of abnormality in the step by having detected a fixed frequency of said occurrence of said abnormality in the given period.

15. An FA information collecting method as claimed in claim 11, wherein there is a tendency that a time change in the desired information in the given period is adjacent to the limit value of management, and the abnormal value is judged to be an occurrence of abnormality when a time change exceeds the said limit value of management.

16. An FA information collecting apparatus for use in an FA system for managing plural steps to manufacture products by using a network, the apparatus comprising:
- a first collector that collects working front information sent to a data transmission line in the network and generated in each of said plural steps, from an information collecting end provided on said network; and
- a second collector that collects changes over time in said desired information automatically, based on a given condition from among the working front information, wherein said given condition includes an abnormality determined by comparing said desired information to a prescribed threshold.

17. An FA information collecting system for use in an FA system for managing plural steps to manufacture products by using a network, the system comprising:
- means for collecting working front information sent to a data transmission line in the network and generated in each of said plural steps, from an information collecting end provided on said network; and
- means for collecting changes over time in said desired information automatically, based on a given condition from among the working front information, wherein said given condition includes an abnormality deter mined by comparing said desired information to a prescribed threshold.

18. A system for managing a manufacturing process, comprising:
   a terminal that generates a monitoring instruction from a user, said terminal being configured to perform processing and analysis; and
   an agent house, coupled to said terminal via a network, that receives said monitoring instructions, collects working front information at a plurality of manufacturing steps, and outputs
   a subset of said working front information as desired information to said terminal for at least one of said processing and said analysis upon an abnormality being detected at any of said plurality of manufacturing steps.

19. The system of claim 20, wherein said agent house comprises a first agent that collects said working front information at each of said manufacturing steps, and a second agent that receives and combines said working front information data to generate said subset of said working front information.

20. The system of claim 19, wherein said abnormality comprises a measured value of said working front information that exceeds a prescribed threshold.

* * * * *